United States Patent
Kudo

(10) Patent No.: US 8,368,287 B2
(45) Date of Patent: Feb. 5, 2013

(54) ULTRASONIC MOTOR MECHANISM

(75) Inventor: Koichi Kudo, Hachioji (JP)

(73) Assignee: Olympus Corporation, Tokyo (JP)

( * ) Notice: Subject to any disclaimer, the term of this patent is extended or adjusted under 35 U.S.C. 154(b) by 376 days.

(21) Appl. No.: 12/875,296

(22) Filed: Sep. 3, 2010

(65) Prior Publication Data

US 2011/0057542 A1 Mar. 10, 2011

(30) Foreign Application Priority Data

Sep. 7, 2009 (JP) .................................. 2009-205896

(51) Int. Cl.
*H02N 2/00* (2006.01)
(52) U.S. Cl. .......... 310/323.09; 310/323.01; 310/323.14
(58) Field of Classification Search ............. 310/323.01, 310/323.09, 323.14, 323.16, 323.17
See application file for complete search history.

(56) References Cited

U.S. PATENT DOCUMENTS

| | | | | |
|---|---|---|---|---|
| 6,242,846 | B1 * | 6/2001 | Ashizawa et al. | 310/323.02 |
| 7,084,550 | B2 * | 8/2006 | Sasaki et al. | 310/323.17 |
| 2004/0216289 | A1 * | 11/2004 | Ikeda et al. | 29/25.35 |

FOREIGN PATENT DOCUMENTS

JP 2008-67479 3/2008

OTHER PUBLICATIONS

Abstract of International Publication No. WO 2008/026552 A1, dated Mar. 6, 2008.

* cited by examiner

*Primary Examiner* — Thomas M Dougherty
(74) *Attorney, Agent, or Firm* — Scully Scott Murphy & Presser, PC

(57) ABSTRACT

An ultrasonic motor mechanism includes an ultrasonic vibrator that includes a piezoelectric element; a driven member that is driven relative to the ultrasonic vibrator because of a frictional force generated between the ultrasonic vibrator and the driven member; a coupling member that is coupled to the driven member; a first urging member that urges the ultrasonic vibrator with the driven member; a base member that movably supports the driven member; and a spherical rolling member that movably supports the driven member with respect to the base member. By interposing a second urging member between the driven member and the coupling member, the driven member is urged in a longitudinal direction. The driven member and the coupling member are coupled to each other by causing the driven member to abut the coupling member.

8 Claims, 3 Drawing Sheets

ULTRASONIC MOTOR MECHANISM

CROSS-REFERENCE TO RELATED APPLICATIONS

The present application is based upon and claims the benefit of priority from the prior Japanese Patent Application No. 2009-205896 filed on Sep. 7, 2009; the entire contents of which are incorporated herein by reference.

BACKGROUND OF THE INVENTION

1. Field of the Invention

The present invention relates to an ultrasonic motor mechanism.

2. Description of the Related Art

A driving device disclosed in Japanese Patent Application Laid-open No. 2008-67479 is an example of an ultrasonic motor mechanism. The driving device includes a first driving mechanism that relatively moves a first frame body and a second frame body, and a second driving mechanism that relatively moves the second frame body and a third frame body. Each of the first and the second driving mechanisms includes a drive generating unit that generates a driving force with a piezoelectric element and a drive receiving unit that receives the driving force generated by the drive generating unit. Both end portions of a shaft of the drive receiving unit of the first driving mechanism are fixed to the first frame body and both end portions of a shaft of the drive receiving unit of the second drive mechanism are fixed to the second frame body.

However, when fixing the shaft and the corresponding frame body (coupling member) to each other, how to perform positioning of the shaft with high precision with respect to the frame body is not specifically considered in the driving device that is disclosed in Japanese Patent Application Laid-open No. 2008-67479. To perform positioning of the shaft with high precision with respect to the frame body in the driving device, a dedicated jig or a tool is necessary.

SUMMARY OF THE INVENTION

The present invention has been made in view of the above discussion. It is an object of the present invention to provide an ultrasonic motor mechanism that enables positioning of a shaft and a coupling member with high precision without using a dedicated jig or a tool.

To solve the above problems and to achieve the above objects, an ultrasonic motor mechanism according to an embodiment of the present invention includes an ultrasonic vibrator that includes a piezoelectric element; a driven member that is driven relative to the ultrasonic vibrator because of a frictional force generated between the ultrasonic vibrator and the driven member; a coupling member that is coupled to the driven member; a first urging member that urges the ultrasonic vibrator with the driven member; a base member that movably supports the driven member; and a spherical rolling member that movably supports the driven member with respect to the base member. By interposing a second urging member between the driven member and the coupling member, the driven member is urged in a longitudinal direction. The driven member and the coupling member are coupled to each other by causing the driven member to abut the coupling member.

According to another aspect of the present invention, it is preferable that a first end portion of the driven member in the longitudinal direction is urged by the second urging member, and a second end portion is engaged in a groove formed in the coupling member.

According to another aspect of the present invention, it is preferable that the second urging member is a screw or a spring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an ultrasonic motor mechanism according to the present invention are described below in greater detail with reference to the accompanying drawings. The present invention is by no means limited to the following embodiments.

Figure 1:
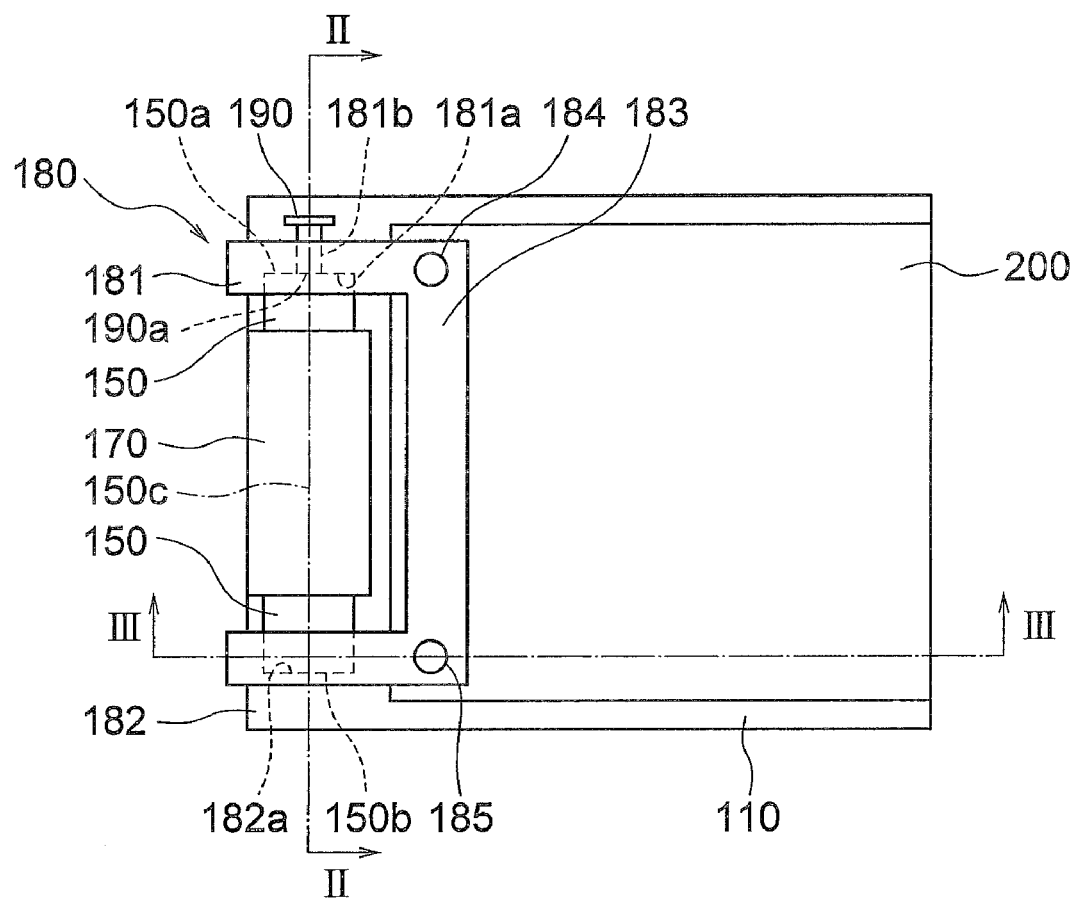
FIG. 1 is a plan view showing a structure of an ultrasonic motor mechanism according to an embodiment of the present invention.
Figure 2:
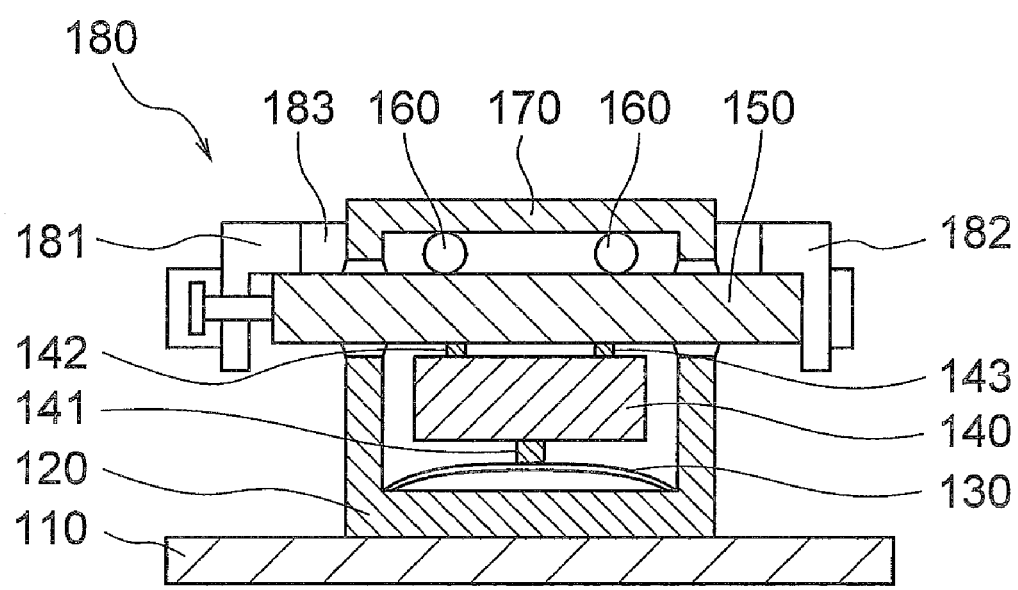
FIG. 2 is a cross sectional view taken along a line II-II shown in FIG. 1.
Figure 3:
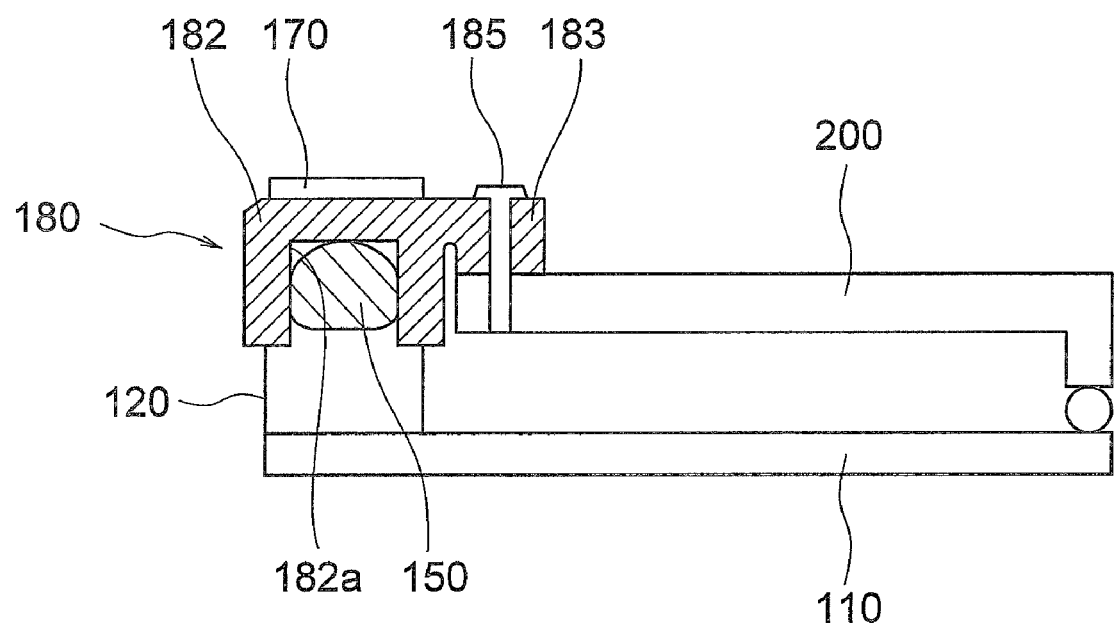
FIG. 3 is a cross sectional view taken along a line shown in FIG. 1.

FIG. 1 is a plan view showing a structure of an ultrasonic motor mechanism according to an embodiment of the present invention. FIG. 2 is a cross sectional view taken along a line II-II shown in FIG. 1. FIG. 3 is a cross sectional view taken along a line shown in FIG. 1.

As shown in FIGS. 1 to 3, the ultrasonic motor mechanism includes an ultrasonic vibrator, which includes a piezoelectric element 140 and driving elements 142 and 143, a shaft 150 that is a driven member having a cylindrical surface, a coupling member 180, a pressing member 130 that is a first urging member, a base member 170, and four rolling members 160. The ultrasonic motor mechanism further includes a case member 120 that is coupled to the base member 170, and that houses the ultrasonic vibrator and the pressing member 130. The case member 120 is mounted on a base stand 110.

The base member 170 is substantially square U shaped in cross section and it encloses the four rolling members 160. Each rolling member is a spherical member. The rolling members 160 can move freely in a longitudinal direction (a vertical direction in FIG. 1 and a horizontal direction in FIG. 2) inside the base member 170. More than four rolling members 160 can be used if they are able to freely move in the longitudinal direction inside the base member 170.

The shaft 150 has a lateral surface that includes a cylindrical surface and a plane surface. That is, a cross section orthogonal to the longitudinal direction of the shaft 150 is substantially D shaped. The shaft 150 is mounted such that the cylindrical surface of the shaft 150 abuts the rolling members 160.

One end portion of the shaft 150 in the longitudinal direction is coupled to a first arm 181 and the other end portion is coupled to a second arm 182 of the coupling member 180. The first arm 181 and the second arm 182 transmit driving displacement of the shaft 150 to an external device.

The case member 120 is box shaped and it encloses the piezoelectric element 140 and the pressing member 130. The piezoelectric element 140 is arranged above the pressing member 130 in a height direction (vertical direction in FIGS. 2 and 3). A metallic plate spring is used as the pressing member 130. A downwardly protruding supporting member 141 is provided on the lower surface of the piezoelectric element 140. The supporting member 141 abuts an upper surface of the pressing member 130. Both the sides of the pressing member 130 in the longitudinal direction (horizontal direction in FIG. 2) abut an inner wall of the case member 120. The pressing member 130 is bent in a convex shape and in this state it supports the case member 120.

The base member 170 and the case member 120 are coupled to each other with a mechanism that includes a plurality of protruding parts provided on an upper portion of the case member 120 and a plurality of locking parts provided on the lower portion of the base member 170 that can be engaged with the protruding parts of the case member 120.

The driving elements 142 and 143 are provided on an upper surface of the piezoelectric element 140. The driving elements 142 and 143 protrude in an upward direction. Thus, when the case member 120 is assembled with the base member 170, the driving elements 142 and 143 abuts the plane surface on the lower side of the shaft 150. Moreover, a substantially central portion of the pressing member 130 in the longitudinal direction abuts the supporting member 141 in a state in which the pressing member 130 is curved by a predetermined amount. An amount of curvature of the pressing member 130 can be set as desired. By setting an appropriate amount of curvature, a desired pressing force can be exerted from the piezoelectric element 140 on the shaft 150 via the driving elements 142 and 143. Because the driving elements 142 and 143 are engaged with the shaft 150, a frictional force is generated between the driving elements 142 and 143, and the shaft 150. Therefore, by driving the piezoelectric element 140, the shaft 150 can be moved in the longitudinal direction (vertical direction in FIG. 1, and horizontal direction and driving direction in FIG. 2) with respect to the base member 170.

The coupling member 180 includes a base member 183, the first arm 181, and the second arm 182. The base member 183 extends substantially parallel to the longitudinal direction of the shaft 150. The first arm 181 is provided on one side and the second arm 182 is provided on the other side of the base member 183. The coupling member 180 is square U shaped in a plan view. A first groove 181a that receives one end portion of the shaft 150 in the longitudinal direction is provided in the first arm 181. A second groove 182a that receives the other end portion of the shaft 150 is provided in the second arm 182. The first groove 181a and the second groove 182a are formed from inside to outside in a bottomed concave shape. As shown in FIG. 3, the upper surfaces and the side surfaces of both the end portions of the shaft 150 abut the first groove 181a and the second groove 182a, thereby supporting the shaft 150. The coupling member 180 can be formed of a plurality of members.

Furthermore, a small diameter screw hole 181b that passes through a wall of the first arm 181 is formed inside the first groove 181a. The screw hole 181b is substantially parallel to the axial direction of the shaft 150. A fixing screw 190 that is a second urging member is screwed into the first groove 181a. The fixing screw 190 is retractable in the axial direction of the shaft 150.

A through hole is formed in the base member 183 in the height direction and a screw hole is formed at a position corresponding to this through hole in a frame member 200, and a screw 184 is screwed in these holes. A through hole is formed in the base member 183 in the height direction and a screw hole is formed at a position corresponding to this through hole in the frame member 200, and a screw 185 is screwed in these holes. Thus, the coupling member 180 is fixed to the frame member 200.

A shape other than the frame member 200 can be used as a shape of the external device that is to be coupled using the coupling member 180.

In the ultrasonic motor mechanism according to the present embodiment, a tip 190a of the fixing screw 190 that is screwed inside the first groove 181a is made to abut one end surface 150a of the shaft 150. Depending on an amount of screwing of the fixing screw 190 into the first groove 181a, the shaft 150 moves along an axial direction 150c (longitudinal direction) while guiding to the inner surfaces of the first groove 181a and the second groove 182a. The shaft 150 stops from moving when the other end surface 150b of the shaft 150 abuts the inner surface of the second groove 182a. When the shaft 150 stops moving, the shaft 150 is fixed in a state in which the end surface 150a is in contact with the tip 190a of the fixing screw 190 and the end surface 150b abuts an inner surface of the second groove 182a.

Instead of the fixing screw 190, the second urging member can be, for example, a spring or an elastic member. When a spring is used, one end of the spring in its expansion and compression direction abuts one end surface 150a of the shaft 150, and the other end of the spring abuts the inner wall of the first groove 181a. In such a case, a spring that has a compressibility by which the shaft 150 can be urged to the end surface 150b side is used.

In the ultrasonic motor mechanism having the configuration described above, when the piezoelectric element 140 is driven, the shaft 150 that is pressed towards the base member 170 side by the pressing member 130 is driven in the longitudinal direction. Under such situation, the rolling members 160 receive a driving force of the shaft 150 in the longitudinal direction at a point of contact with the shaft 150 and the begin rolling. As a result, the shaft 150 is driven smoothly.

When the shaft 150 is driven, the coupling member 180 also moves with the shaft 150. The displacement of the shaft 150 is transmitted to the frame member 200 (external device) that is coupled to the coupling member 180.

In the ultrasonic motor mechanism according to the present embodiment, the shaft 150 is assembled by tightening the fixing screw 190 until the end surface 150b of the shaft 150 abuts the second groove 182a. In other words, by interposing the fixing screw 190 that is the second urging member between the shaft 150 (driven member) and the coupling member 180, the shaft 150 is urged in the longitudinal direction. Due to this, the shaft 150 is caused to abut the coupling member 180 and it is coupled to the coupling member 180. As a result, the coupling member 180 and the shaft 150 can be coupled with high precision and easily. Because only the fixing screw 190 is used, it is not necessary to significantly change the configuration of the ultrasonic motor mechanism. Moreover, the number of parts is not significantly increased, and there is no need to provided a separate dedicated jig.

Positioning of the driven member can be performed easily and with high precision due to length tolerance of the driven member and a groove structure provided in the coupling member. Because the coupling member 180 and the shaft 150 are fixed only by tightening one fixing screw 190, disassembling, if required, can be performed quickly.

Because an end surface of the fixing screw is fixed in a direction in which longitudinal vibrations of the shaft 150 are suppressed, excess longitudinal vibrations of the shaft 150 can be reduced during driving operation. Due to this, the characteristics of the shaft 150 are stabilized.

Furthermore, assembling is completed with the tightening of the fixing screw 190. Thus, in comparison with a fixing method that employs an adhesive, fixing can be performed within a shorter time. Therefore, efforts required for assembling can be reduced and cost can also be reduced.

As described above, the ultrasonic motor mechanism according to the present invention is applicable to a driving device that requires positioning of the driven member and the coupling member with high precision.

In the ultrasonic motor mechanism according to the embodiments of the present invention, positioning of the shaft and the coupling member can be performed with high precision.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An ultrasonic motor mechanism comprising:
    an ultrasonic vibrator that includes a piezoelectric element;
    a driven member that is driven relative to the ultrasonic vibrator because of a frictional force generated between the ultrasonic vibrator and the driven member;
    a coupling member that is coupled to the driven member;
    a first urging member that urges the ultrasonic vibrator with the driven member;
    a base member that movably supports the driven member; and
    a spherical rolling member that movably supports the driven member with respect to the base member,
    wherein by interposing a second urging member between the driven member and the coupling member, the driven member is urged in a longitudinal direction, and
    the driven member and the coupling member are coupled to each other by causing the driven member to abut the coupling member.

2. The ultrasonic motor mechanism according to claim 1, wherein a first end portion of the driven member in the longitudinal direction is urged by the second urging member, and a second end portion is engaged in a groove formed in the coupling member.

3. The ultrasonic motor mechanism according to claim 1, wherein the second urging member is a screw or a spring.

4. The ultrasonic motor mechanism according to claim 2, wherein the second urging member is a screw or a spring.

5. The ultrasonic motor mechanism according to claim 1, wherein the coupling member includes a plurality of members.

6. The ultrasonic motor mechanism according to claim 2, wherein the coupling member includes a plurality of members.

7. The ultrasonic motor mechanism according to claim 3, wherein the coupling member includes a plurality of members.

8. The ultrasonic motor mechanism according to claim 4, wherein the coupling member includes a plurality of members.

* * * * *